May 12, 1970            G. W. HICKS            3,511,277
MIXING VALVE FOR A FAUCET
Filed May 10, 1968
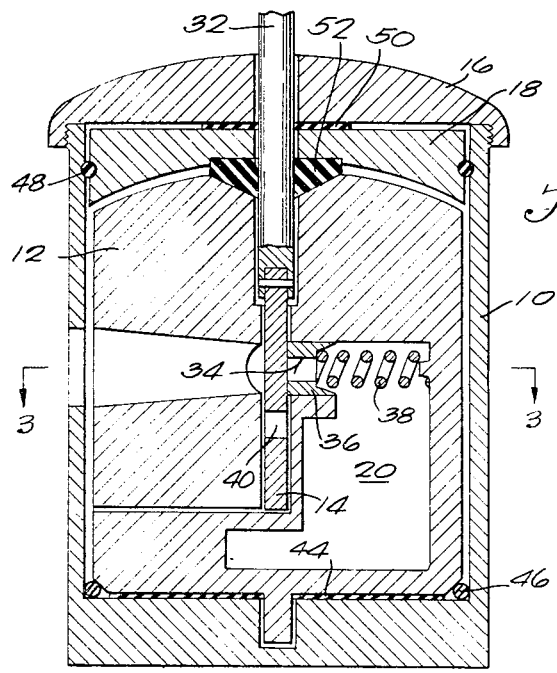
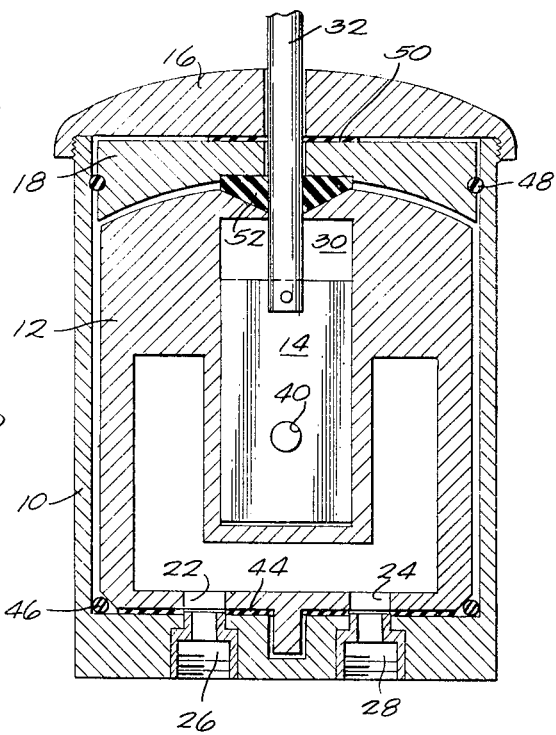
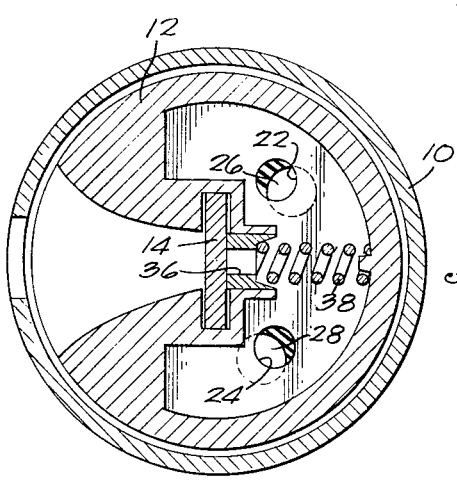
Inventor
Glenn W. Hicks
By Andrew O. Riteris
Attorney United States Patent Office 3,511,277
Patented May 12, 1970

3,511,277
MIXING VALVE FOR A FAUCET
Glenn W. Hicks, 2749 N. 75th St.,
Milwaukee, Wis. 53210
Filed May 10, 1968, Ser. No. 728,135
Int. Cl. F16k 11/18
U.S. Cl. 137—637.4                    7 Claims

ABSTRACT OF THE DISCLOSURE

A faucet of the type in which rotation of the valve stem results in a change in the mix between hot and cold water and in which raising and lowering of the valve stem causes change in the flow rate through the faucet.

BACKGROUND OF INVENTION

The field of invention may be defined as mixing valves.

Prior to the present invention several attempts have been made to provide a mixing valve in which a single lever would control the mixture between hot and cold water and in which the same lever would be employed to control the flow rate through the valve. One example of such prior attempts is the United States Letters Patent No. 3,324,884 issued to Dornaus which shows the use of a ball valve element to accomplish this purpose. Another example is United States Letters Patent No. 3,190,309, issued to Staat et al. which shows the use of a slidable and rotatable valve element. The principal disadvantage of prior art mixing valves of this nature is that they employed fairly complicated mechanisms to accomplish the mixing and flow control functions. The use of such mechanisms, of course, adds significantly to the initial cost of manufacture of the mixing valve. Also, the complexity of the valves necessarily adds to the cost of installation and repair.

SUMMARY OF THE INVENTION

The inventive concept of the present invention resides in providing a single cartridge, which cartridge is mounted within a suitable valve housing and incorporates a mixing chamber and a sliding valve block. The rotation of the valve block rotates the cartridge within the valve housing. Such rotation varies the degree of opening of the hot and cold water inlet ports which lead to the mixing chamber. The valve block is vertically slidably mounted within the cartridge. It may be moved from a position in which it blocks the exit port of the mixing chamber and the degree of vertical movement of the valve block varies the exposure of the exit port from the mixing chamber to thus vary the amount of flow through the valve. The simplicity of this design significantly reduces the cost of manufacture of the valve. The design also permits easy assembly of the cartridge within the valve body and, in view of the fairly low cost of the cartridge, will permit repair of the valve by mere replacement of the cartridge.

DESCRIPTION OF THE DRAWINGS

FIG. 1 is a cross-sectional side view of the mixing valve embodying the present invention;

FIG. 2 is a cross-sectional side view taken on line 2—2 of FIG. 1; and

FIG. 3 is a cross-sectional plan view taken on line 3—3 of FIG. 1.

Referring to the drawings in detail, the mixing valve embodying the present invention is essentially comprised of a valve housing 10, a cartridge 12 which carries a slidable valve block 14, and an end cap 16 which captures the cartridge within the housing. A suitable spacer 18 is provided between the cartridge and the end cap. The housing 10 is of conventional design and its outside contour and the connections to the hot and cold water supply as well as the spout of the faucet may be varied to suit the particular application. These features are not of essence in the present invention and are, therefore, not shown in detail. The essence of the invention resides in the cartridge itself.

The cartridge 12 may be a plastic molding which is made of plastic material which is compatible to continued use with hot and cold water. Several suitable plastic materials are known to the art; however, "Delrin" a trademark of Du Pont de Nemours is one of the presently best-suited materials since it is readily moldable and since it is not affected by continuous exposure to hot or cold water. This material is further preferred since it provides an easy sliding contact between the valve block and the cartridge. However, brass may also be employed.

The cartridge 10 has a central mixing chamber 20. The mixing chamber has inlet ports 22 and 24 which communicate with corresponding hot water and cold water inlet fittings 26 and 28 of the valve housing. The latter are threaded to permit them to be connected to suitable water pipes in the known manner.

The valve block 14 is preferably made of stainless steel and it is slidably mounted within a rectangular slot 30 and is connected to a valve stem 32. The latter is provided with a suitable handle (not shown) which permits the valve stem to be moved vertically as well as rotationally.

Rotation of the valve stem rotates the cartridge within the housing to thereby vary the degree of exposure of inlet ports 26 and 28. The rotational valve stem movement is transferred to the cartridge by the engagement of the valve block 14 within the rectangular slot 30. At one extreme position port 26 is completely closed and port 28 is fully exposed to thereby permit only cold water to enter the mixing chamber. As the cartridge is rotated port 28 will become partially closed and port 26 will become gradually exposed to thereby permit hot and cold water to enter the mixing chamber. The cartridge has been rotated to that position in FIG. 3. The proportion of the hot and cold water is, of course, dependent upon the degree of rotation of the cartridge. As the cartridge is fully rotated from the above-mentioned extreme position, port 28 will become fully closed and port 26 will become fully opened to thus permit only hot water to enter the mixing chamber.

Vertical movement of the valve stem controls the flow through the valve. When the valve block 14 is in its lowermost position, as shown in FIGS. 1 and 2, the valve block 14 blocks the exit port 34 of the mixing chamber. A resilient seal 36 is biased against the face of the valve block by a spring 38. As the block 14 is moved upwardly the control port 40 will be gradually moved in alignment with exit port 34. The degree of overlays between ports 40 and 36, of course, controls the amount of flow from the mixing chamber to the exit port 42 of the valve housing. The flow will be relatively small if the valve stem is moved sufficiently to provide only minimal overlay between ports 40 and 34 and the flow will be at a maximum when the two ports are in full alignment. When the valve block closes the exit port 34, the seal 36 presses with sufficient force against the face of the valve block to provide an adequate seal.

The disclosed faucet requires a resilient gasket 44, which is provided with appropriate apertures at the locations of the inlet and outlet openings. The gasket is fixed to the floor of the casing and the fittings 26 and 28 project partially into the apertures of the gasket. Suitable O-rings 46 and 48 are provided to seal the cartridge and the spacer 18. A gasket 50 and a resilient washer 52 are provided to seal the valve stem 32. The faces of the gasket 44, the O-ring 46, and washer 52 may be covered with a suitable anti-frictional material, such as Teflon (tetrafluoroethylene) to attain a relatively smooth contact surface between the cartridge and the mentioned sealing elements.

I claim:

1. A faucet adapted to control the mixture of hot and cold water and the amount of flow by means of one manual control, the faucet comprising:

a hollow housing having hot water and cold water inlet ports and an outlet port, a cartridge rotatably mounted within said housing, said cartridge having a mixing chamber and hot water and cold water inlet ports to said mixing chamber, said cartridge being rotatable from a first position in which said two cold water ports are in alignment with each other and in which said housing hot water port is blocked to a second position in which said two hot water ports are in alignment with each other and in which said housing cold-water port is blocked, said two hot water and two cold water ports being in partial alignment with each other as the cartridge is rotated between said first and second positions, said mixing chamber also having an exit port, valve block means slidably mounted within said cartridge and having a control port, said valve block means being lineally movable between a first position in which said valve block means blocks said mixing chamber exit port to a second position in which said control port is in full alignment with said mixing chamber exit port, said valve block means gradually exposing said mixing chamber exit port as it is moved from said first to said second positions to thereby gradually increase the flow rate through said mixing chamber exit port; said mixing chamber exit port, said housing outlet port and said control port being in communication with each other as said valve block means is moved from said first to said second position, and manual control means connected to said valve block member and projecting from said housing, said manual control means being operable to be lineally moved to thereby move said valve block between said first and second positions and said manual control means being operable to be rotated to thereby impart rotational movement to said cartridge and thus permit said cartridge to be rotated between said first and second positions.

2. A faucet according to claim 1 wherein said mixing chamber exit port incorporates a resilient seal which is biased against said valve block means to thereby seal said mixing chamber at times when said valve block means is in said first position.

3. A faucet according to claim 2 wherein said resilient seal is a cylindrical member which is biased against said valve block means by a compression spring.

4. A faucet according to claim 1 wherein said carttridge is generally cylindrical in shape and wherein said mixing chamber inlet ports are located on the lower flat face of said cartridge.

5. A faucet according to claim 4 including sealing means positioned between said lower flat face of said cartridge and said housing.

6. A faucet according to claim 5 wherein the face of said sealing means which is in contact with said cartridge is covered with anti-frictional means.

7. A faucet according to claim 6 wherein said sealing means' face is covered with tetrafluoroethylene.

References Cited

UNITED STATES PATENTS

| | | | |
|---|---|---|---|
| 1,898,952 | 2/1933 | Gray | 137—636.4 |
| 2,988,110 | 6/1961 | Thomas | 137—636.4 |
| 3,342,214 | 9/1967 | Panerai | 137—636.4 |

CLARENCE R. GORDON, Primary Examiner

U.S. Cl. X.R.

137—607